United States Patent
Kucar et al.

(10) Patent No.: US 8,484,594 B2
(45) Date of Patent: Jul. 9, 2013

(54) ROUTING-BASED PIN PLACEMENT

(75) Inventors: Dorothy Kucar, Yorktown Heights, NY (US); Jarrod A. Roy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 13/005,330

(22) Filed: Jan. 12, 2011

(65) Prior Publication Data
US 2012/0180017 A1   Jul. 12, 2012

(51) Int. Cl.
*G06F 17/50* (2006.01)
(52) U.S. Cl.
USPC ............ 716/110; 716/119; 716/122; 716/126
(58) Field of Classification Search
USPC .................................................. 716/110–126
See application file for complete search history.

(56) References Cited

U.S. PATENT DOCUMENTS

| | | | |
|---|---|---|---|
| 5,638,293 A | 6/1997 | Scepanovic et al. | |
| 6,075,934 A | 6/2000 | Chiluvuri et al. | |
| 6,449,760 B1 | 9/2002 | Tetelbaum et al. | |
| 6,460,169 B1 * | 10/2002 | Camporese et al. | 716/122 |
| 6,865,721 B1 * | 3/2005 | Dahl et al. | 716/124 |
| 7,111,265 B1 | 9/2006 | Tan et al. | |
| 7,114,142 B1 * | 9/2006 | Segal et al. | 716/129 |
| 7,577,933 B1 | 8/2009 | Wu et al. | |
| 2005/0076319 A1 | 4/2005 | Chow et al. | |

OTHER PUBLICATIONS

Thomas Pfortner et al., "Embedded Pin Assignment for Top Down Systems Design," KnowledgeGate from IBM Market Insights, IEEE, 1992.
Scheffer et al., "Industrial Floorplanning and Prototyping," From: EDA for IC System Design, Verification, and Testing, 2006.
Jurjen Westra and Patrick Groeneveld, "Towards Integration of Quadratic Placement and Pin Assignment," Eindhoven University of Technology, Department of Electrical Engineering; Electronic Systems, Mar. 2005.
Hua Xiang et al., "An Algorithm for Simultaneous Pin Assignment and Routing," Proceedings of the IEEE/ACM International Conference on Computer-aided Design 2001.
X. Yao et al., "A New Approach to the Pin Assignment Problem," 25th ACM/IEEE Design Automation Conference, 1988.

\* cited by examiner

*Primary Examiner* — Paul Dinh
(74) *Attorney, Agent, or Firm* — Cantor Colburn LLP; William A. Kinnaman, Jr.

(57) ABSTRACT

A method for routing-based pin placement is provided and includes receiving a logical description of a macro of a partitioned circuit with connectivity information and a physical outline, generating an abstracted shape as an abstraction of a generic shape of a pin for providing a connection to the macro in accordance with the connectivity information as a shape conforming to dimensions of the macro, providing a routing tool with freedom to route a net for connection to the pin toward any part of the abstracted shape of the pin to create a routed net and identifying a location where the routed net crosses the physical outline as a chosen location for the pin.

22 Claims, 3 Drawing Sheets

40
41

ROUTING-BASED PIN PLACEMENT

BACKGROUND

Aspects of the present invention are directed to routing-based pin placement and, more particularly, to routing-based pin placement using pin configurations as anchor points to guide a routing tool.

In very large scale integration (VLSI) and/or other similar chip design processes, integrated circuits are created as a result of a combination of thousands or millions of transistors into a single chip. Successful completion of the VLSI and/or the other similar chip design processes generally requires that the chip design be organized and partitioned into smaller units that are commonly referred to as macros. The macros may themselves be representations of individual cells or macro blocks of cells that have some relationship with one another. The macros are then positioned onto the chip at one or more layers thereof along with chip boundary connections, obstacles and nets in accordance with various optimizing rules. The nets serve to connect the macros and the chip boundary connections with one another while avoiding the obstacles.

Pin assignment or placement processes refer to the placement of pins at the chip boundary connections and the boundaries of the macros. The nets connect to these pins and provide signal communication capabilities between mutually connected features. That is, in a hierarchical flow, pins serve as the interface between the components placed in an interior of a macro and elements outside of the macro (i.e., the chip boundary connections or the other macros) at the top level of the chip design. Typically, the positions of the pins are chosen such that the smallest wire lengths within the macro are achieved while physical top level synthesis is not simultaneously forced to suffer from badly placed pins. The first issue is normally addressed by formulating internal macro wire length as an objective such that the overall design aims to minimize the overall wire length. The second issue is addressed by formulating pin constraints.

In practice, neither issue can be addressed perfectly. Pin locations are typically based on the wire length constraints at the higher level hierarchy, but those are not necessarily optimal pin locations based on wire length constraints at the macro-level of hierarchy.

SUMMARY

In accordance with an aspect of the invention, a method for routing-based pin placement is provided and includes receiving a logical description of a macro of a partitioned circuit with connectivity information and a physical outline, generating an abstracted shape as an abstraction of a generic shape of a pin for providing a connection to the macro in accordance with the connectivity information as a shape conforming to dimensions of the macro, providing a routing tool with freedom to route a net for connection to the pin toward any part of the abstracted shape of the pin to create a routed net and identifying a location where the routed net crosses the physical outline as a chosen location for the pin.

In accordance with an aspect of the invention, a method for operating a routing tool for routing-based pin placement is provided and includes inputting into the routing tool a logical description of a macro of a partitioned circuit with connectivity information and a physical outline, instructing the routing tool to generate an abstracted shape as an abstraction of a generic shape of a pin for providing a connection to the macro in accordance with the connectivity information as a shape conforming to dimensions of the macro, providing the routing tool with freedom to route a net for connection to the pin toward any part of the abstracted shape of the pin to create a routed net and instructing the routing tool to identify a location where the routed net crosses the physical outline as a chosen location for the pin.

In accordance with an aspect of the invention, a system for executing routing-based pin placement is provided and includes a computing device to generate a logical description of a macro of a partitioned circuit with connectivity information and a physical outline, a routing tool disposed in signal communication with the computing device to be receptive of the logical description and configured to route a net for connection to the macro and a controller operably coupled to the routing tool to instruct the routing tool to generate an abstracted shape as an abstraction of a generic shape of a pin for providing a connection to the macro in accordance with the connectivity information as a shape conforming to dimensions of the macro, to provide the routing tool with freedom to route a net for connection to the pin toward any part of the abstracted shape of the pin to create a routed net and to instruct the routing tool to identify a location where the routed net crosses the physical outline as a chosen location for the pin.

In accordance with another aspect of the invention, a method for routing-based pin placement is provided and includes receiving a logical description of a macro of a partitioned circuit with connectivity information and a physical outline, generating one or more abstracted shapes as abstractions of a generic shape of an actual pin for providing a connection to the macro in accordance with the connectivity information as a shape conforming to dimensions of the macro as described by the logical description, providing a routing tool with freedom to route a net for connection to the pin toward any part of one of the one or more of the abstracted shapes of the pin to create a routed net and identifying a location where the routed net crosses the physical outline as a chosen location for the actual pin.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
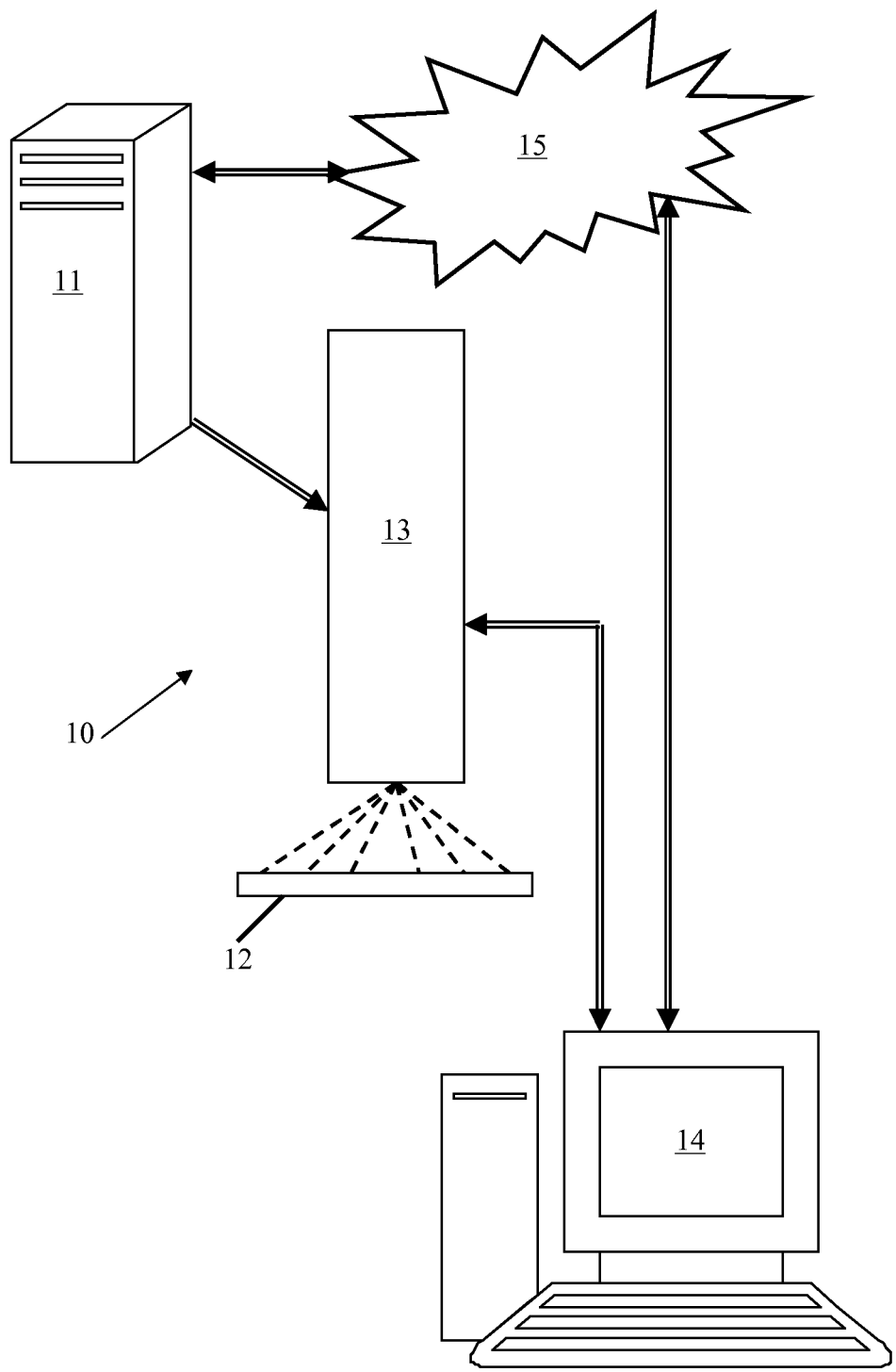
FIG. 1 is a schematic illustration of a system for routing-based pin placement.

With reference to FIG. 1, a system 10 for executing routing-based pin placement is provided. The system 10 includes a computing device 11, a chip 12, a routing tool 13 disposed in signal communication with at least the computing device 11 for operation on the chip 12 and a controller 14, which is operably coupled to the routing tool 13. The chip 12 is a chip, such as a semiconductor microchip, on which an integrated circuit (IC) is formed or is being designed and formed.

The computing device 11 is configured to generate a logical description of a macro of a partitioned circuit of the chip 12. The macro is a generalized depiction of a cell or circuit of the chip 12 or a plurality of cells having a certain relationship with one another. The logical description includes connectivity information that describes the connections that will be necessary for the operation of the macro, in particular, and the chip design of the chip 12, in general. The logical description also includes a physical outline of the macro, which may be of any shape, regular or irregular, and which encompasses a size of the macro with, in most cases, little to no clearance, and may further include a description of macro dimensions.

The computing device 11 has a processing unit and memory/storage units provided therein and, in addition, may be network capable for connection to a network 15. In this way, the data representative of the logical description may be stored locally at the computing device 11, remotely at another computing device or server that is also connected to the network 15 and/or distributed across multiple computing devices or servers all connected to the network 15.

The routing tool 13 is disposed in signal communication with the computing device 11 and is thereby receptive of the logical description from the computing device 11. The routing tool 13 is configured to route a net for connection to the macro. The net can be wiring extending along a plane of a layer of the chip design of the chip 12 around obstacles and from macro to macro, from a chip boundary connection to a macro or from one element to another net. The net may also translate from one chip design layer to another where the features being connected are disposed on different layers or where the routing of the net crosses the routing of another net and it is necessary to translate the net from layer to layer in order to have them remain isolated.

The routing tool 13 may include optical elements to detect the chip 12, computing/processing units, memory/storage devices, tools and materials for laying down the net onto the chip 12 surface and servo controllers for controlling positioning of the tools relative to the chip 12.

The controller 14 is operably coupled to the routing tool 13 and may be embodied as a computing device, such as a client computer interfaced with by a user having, e.g., access to the network 15. The controller 14 includes a processing unit and memory/storage units on which executable instructions are stored. When executed, the executable instructions cause the processing unit to instruct the routing tool 13 to generate an abstracted shape as an abstraction of a generic shape of an actual pin for providing a connection to the macro in accordance with the connectivity information as a shape conforming to dimensions of the macro. In addition, when executed, the executable instructions cause the processing unit to provide the routing tool 13 with freedom to route a net for connection to the pin toward any part of the abstracted shape of the pin to create a routed net and to instruct the routing tool to identify a location where the routed net crosses the physical outline as a chosen location for the actual pin.

Figure 2:
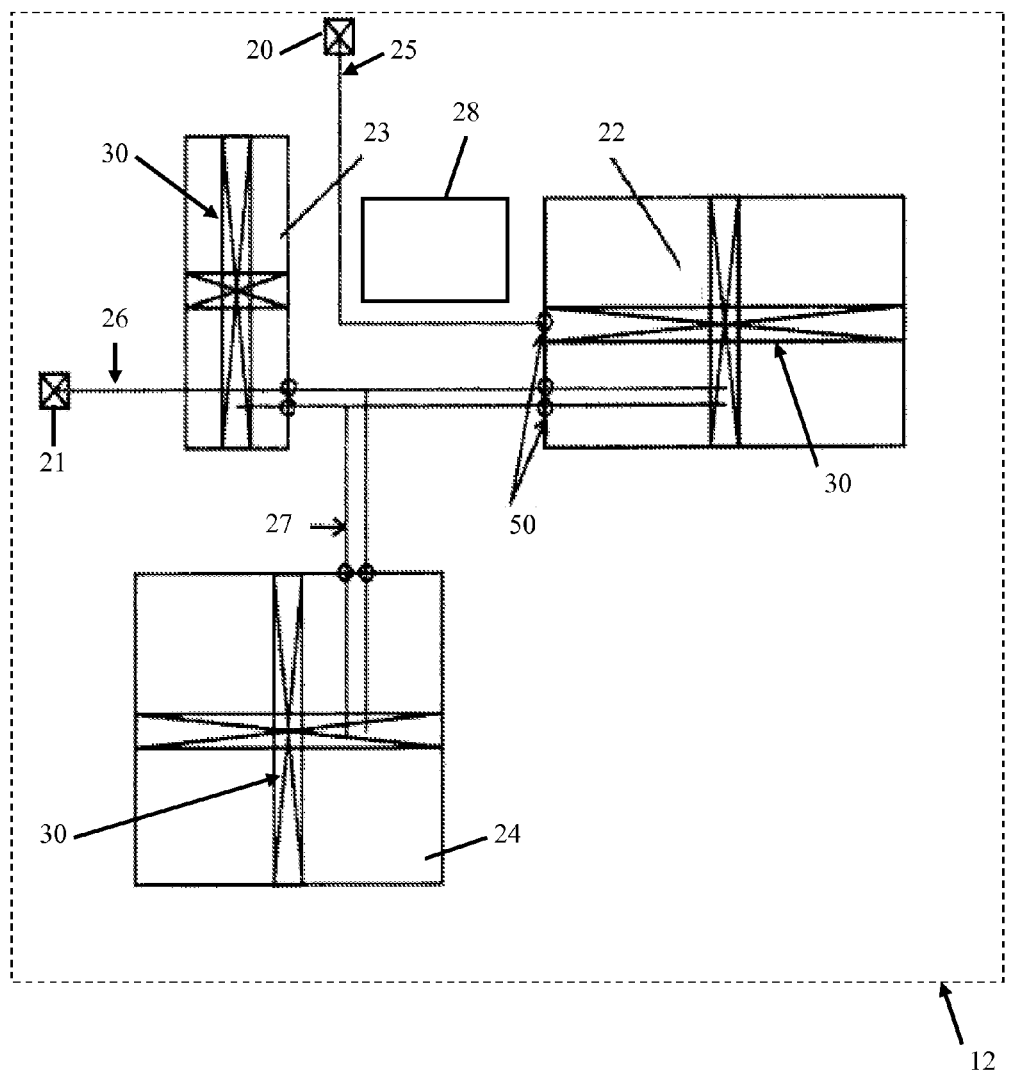
FIG. 2 is a schematic illustration of a chip design.
Figure 3:
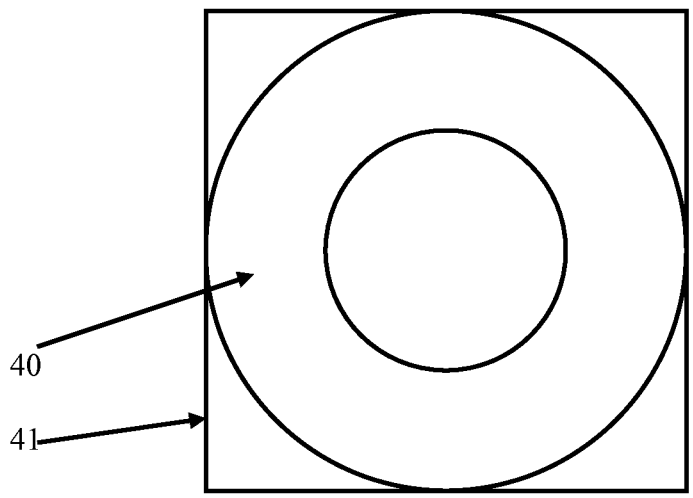
FIG. 3 is a schematic illustration of a chip design according to an alternate embodiment.

In accordance with the description provided above, an exemplary chip design of the chip 12 of system 10 is provided with reference to FIGS. 2 and 3. As shown in FIG. 2, the chip design of the chip 12 includes first and second chip boundary connections (terminals) 20 and 21 and first, second and third macros 22, 23 and 24. The chip design further includes first globally routed net (hereinafter referred to as "net") 25, second net 26 and a pair of third nets 27 along with obstacle 28. The first net connects the first chip boundary connection 20 with the first macro 22 while avoiding contact with obstacle 28, the second net 26 connects the second chip boundary connection 21 with the first, second and third macros 22, 23 and 24 and the third net 27 connects the first, second and third macros 22, 23 and 24.

In forming the first, second and third nets, the routing tool 13 receives the logical description of the first, second and third macros 22, 23 and 24 of the partitioned chip design along with connectivity information and a physical outline of each macro. The connectivity information indicates that the first, second and third macros 22, 23 and 24 need to be connected with the first and second chip boundary connections 20, 21 and with each other as described above while avoiding the obstacle 28. The physical outline of each macro is a schematic illustration of an outer extent of the macro such that the cell or cells therein are encompassed and, though shown in FIG. 2 as rectangular or square, may be any shape or size in correspondence with the shape and size of the cell or cells encompassed thereby.

The controller 14 is then programmed to instruct the routing tool 13 to generate an abstraction of a generic shape of a pin that would be designed for providing one or more connections to each of the first, second and third macros 22, 23 and 24, as deemed necessary in accordance with the connectivity information received by the routing tool 13. That is, for the first macro 22, it is necessary for the first macro to have three pins formed and, for the second and third macros 23 and 24, only two pins are necessary. In each case, however, the pins are, at least initially, regarded as a single pin for each macro although it is to be understood that within this rubric the individual pins can be associated with multiple shapes for each macro. For example, a designer may know a priori that it would be advantageous for a certain pin to be assigned on a north boundary of a particular macro. In this case, the routing tool 13 may be biased toward the north boundary of the macro and the pin shape can be biased towards that boundary as well in a T-shape along with a normative plus-shape. That is, in this case, there may be 2 or more pin shapes for each pin for this particular macro.

In accordance with the instruction from the controller 14, the routing tool 13 generates the abstraction of the generic shape of the pin as a shape conforming to dimensions of each of the first, second and third macros 22, 23 and 24. This shape may be regular or irregular, curved or angular, rectangular or non-rectangular or a combination thereof. As shown in FIGS. 2 and 3, the generating can be accomplished by the routing tool 13 generating the abstraction in the form of plus-shapes 30 (see FIG. 2), in which the distal ends of the arms extend out to the physical outline of the first, second and third macros 22, 23 and 24, and toroidal shapes 40 (see FIG. 3), in which the outer toroidal diameter tangentially contacts the physical outline of the example macro 41, and then overlaying the abstraction of the pin shape onto a schematic illustration of each of the macros with their respective centers aligned so that the outer dimensions can be matched. In this way, the arms of the plus-shapes 30 and the outer diameter of the toroidal shape 40 do not extend beyond the corresponding macro and, thus, a risk of an eventual displacement of a pin for the corresponding macro is avoided. Of course, it is to be understood that the shapes of the abstractions as described above are merely exemplary and that they may have other shapes, such as T-shapes, upside-down T-shapes, X-shapes, Y-shapes, etc.

The directional orientation of each segment of each of the first, second and third nets 25, 26 and 27 results from the controller 14 being further programmed to provide the routing tool 13 with freedom to route each net for connection to each of the necessary pins toward any part of the abstracted shapes of the pins. As such, the routing tool 13 routes the lateral arm of the second net 26 into a center of the first macro 22, the lateral arms of the third net 27 into respective centers of the first and second macros 22 and 23 and the vertical arms of the second and third nets 26, 27 into the center of the third macro 24. In being routed in this manner, the various arms of the first, second and third nets 25, 26 and 27 cross over the physical outlines of the first, second and third macros 22, 23 and 24, as shown in FIG. 2.

In routing the nets, as described above, the routing tool 13 naturally chooses the shortest and straightest route possible for each net if the routing tool 13 is given the freedom to do so. Thus, the controller 14 sets the routing tool in motion but does not otherwise direct its operations other than to place certain minor constraints thereon. For example, the controller 14 may instruct the routing tool 13 to avoid obstacle 28 and to route the nets with certain expected net dimensions. That is, where the net is permitted to be relatively thick, the net may be able to reliably form angles and turns without displacement or other similar failures. By contrast, if the net is expected to be relatively thin, the controller 14 may instruct the routing tool to route the net as straightly as possible so as to avoid deformations and stresses associated with angles that may lead to failures. As noted above, in some cases such as where a designer knows a priori that certain configurations are desirable, the controller 14 as programmed by the designer may further limit or constrain the freedom provided to the routing tool 13 to be biased towards those desirable configurations.

With the various arms of the first, second and third nets 25, 26 and 27 crossing over the physical outlines of the first, second and third macros 22, 23 and 24, as shown in FIG. 2, the controller 14 further instructs the routing tool to identify the cross over locations as chosen locations 50 for the actual pins, which are necessary for the macro connections as determined by the connectivity information. In this way, the locations 50 of the actual pins can be distributed along the physical outlines of each of the macros such that the concentration of wiring in each macro can be correspondingly distributed. This leads to a corresponding decrease in the concentration of such wiring in the centers of the macros.

Figure 4:
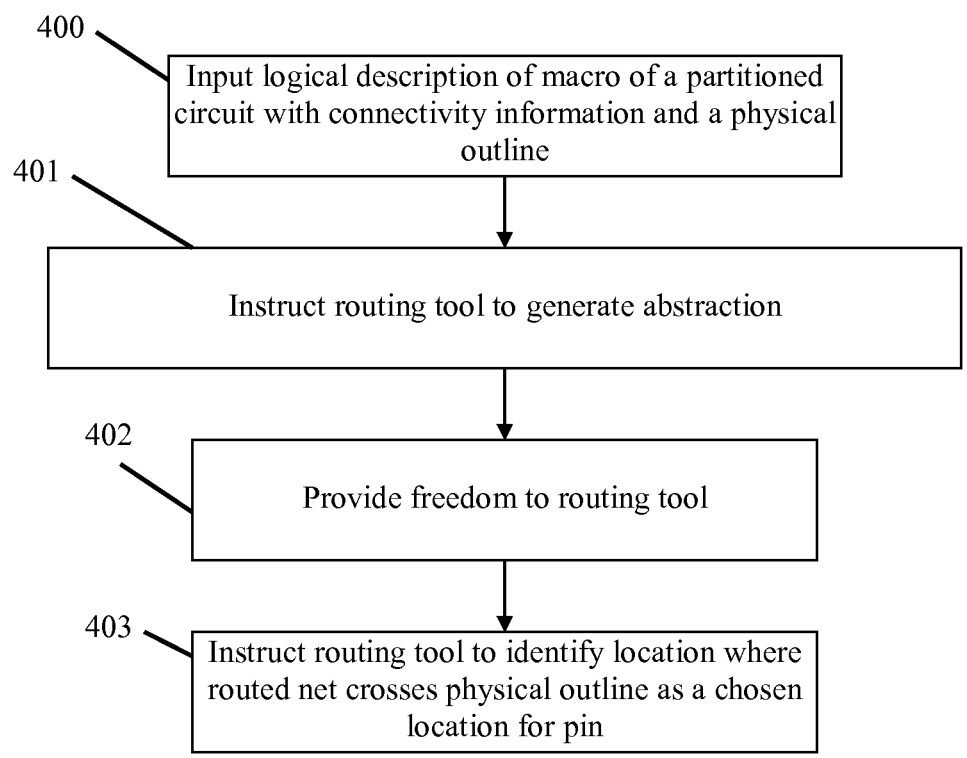
FIG. 4 is a flow diagram illustrating a method for routing-based pin placement.

With reference to FIG. 4 and, in accordance with a further embodiment of the invention, a method for operating a routing tool for routing-based pin placement is provided and includes inputting into the routing tool 13 a logical description of a macro of a partitioned circuit with connectivity information and a physical outline (400), instructing the routing tool 13 to generate an abstraction of a generic shape of a pin for providing a connection to the macro in accordance with the connectivity information as a shape conforming to dimensions of the macro (401), providing the routing tool 13 with freedom (full freedom or constrained freedom) to route a net for connection to the pin toward any part of the abstracted shape of the pin (402) and instructing the routing tool 13 to identify a location 50 where the routed net crosses the physical outline as a chosen location for the pin (403).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method for routing-based pin placement, the method being implemented by a non-transitory computing device including a processing unit and memory having executable instructions stored thereon, which, when executed cause the processing unit to execute the method, the method comprising:
generating a logical description of a macro of a partitioned circuit, the logical description being received at a routing tool coupled to the computing device and including connectivity information of the macro and a physical outline of the macro;
instructing the routing tool to generate an abstracted shape as an abstraction of a generic shape of a pin for providing a connection to the macro in accordance with the connectivity information such that the abstracted shape conforms to dimensions of the macro;
freeing the routing tool to route a net for connection to the pin toward any part of the abstracted shape of the pin to create a routed net; and
instructing the routing tool to identify a location where the routed net crosses the physical outline of the macro as a chosen location for the pin.

2. The method according to claim 1, wherein the abstracted shape comprises a plus-shape.

3. The method according to claim 2, wherein the instructing of the routing tool to generate the abstraction comprises overlaying the plus-shape on a schematic of the macro with respective centers aligned.

4. The method according to claim 1, wherein the abstracted shape comprises a toroidal shape.

5. The method according to claim 4, wherein the instructing of the routing tool to generate the abstraction comprises overlaying the toroidal shape on a schematic of the macro with respective centers aligned.

6. The method according to claim 1, wherein the logical description relates to plural macros, the plural macros being grouped together in a chip design.

7. A method for operating a routing tool for routing-based pin placement, the method being implemented by a non-transitory computing device coupled to the routing tool and including a processing unit and memory having executable instructions stored thereon, which, when executed cause the processing unit to execute the method, the method comprising:
inputting into the routing tool a logical description of a macro of a partitioned circuit, the logical description including connectivity information of the macro and a physical outline of the macro;
instructing the routing tool to generate an abstracted shape as an abstraction of a generic shape of a pin for providing a connection to the macro in accordance with the connectivity information such that the abstracted shape conforms to dimensions of the macro;
freeing the routing tool to route a net for connection to the pin toward any part of the abstracted shape of the pin to create a routed net; and
instructing the routing tool to identify a location where the routed net crosses the physical outline of the macro as a chosen location for the pin.

8. The method according to claim 7, wherein the abstracted shape comprises a plus-shape.

9. The method according to claim 8, wherein the instructing comprises instructing the routing tool to overlay the plus-shape on a schematic of the macro with respective centers aligned.

10. The method according to claim 7, wherein the abstracted shape comprises a toroidal shape.

11. The method according to claim 10, wherein the instructing comprises instructing the routing tool to overlay the toroidal shape on a schematic of the macro with respective centers aligned.

12. The method according to claim 7, wherein the logical description relates to plural macros, the plural macros being grouped together in a chip design.

13. A system for executing routing-based pin placement, the system comprising:
- a computing device to generate a logical description of a macro of a partitioned circuit, the logical description including connectivity information of the macro and a physical outline of the macro;
- a routing tool disposed to communicate with the computing device to be receptive of the logical description and configured to route a net for connection to the macro; and
- a controller operably coupled to the routing tool to instruct the routing tool to generate an abstracted shape as an abstraction of a generic shape of a pin for providing a connection to the macro in accordance with the connectivity information such that the abstracted shape conforms to dimensions of the macro, to free the routing tool to route a net for connection to the pin toward any part of the abstracted shape of the pin to create a routed net, and to instruct the routing tool to identify a location where the routed net crosses the physical outline of the macro as a chosen location for the pin.

14. The system according to claim 13, wherein the abstracted shape comprises a plus-shape.

15. The system according to claim 14, wherein the controller instructs the routing tool to overlay the plus-shape on a schematic of the macro with respective centers aligned.

16. The system according to claim 13, wherein the abstracted shape comprises a toroidal shape.

17. The system according to claim 16, wherein the controller instructs the routing tool to overlay the toroidal shape on a schematic of the macro with respective centers aligned.

18. The system according to claim 13, wherein the logical description relates to plural macros, the plural macros being grouped together in a chip design.

19. The system according to claim 18, wherein the chip design includes non-macro features comprising chip boundary connections and obstacles.

20. The system according to claim 19, wherein the routed net extends from a chosen location of one of the plural macros or one of the non-macro features to a chosen location of another one of the plural macros.

21. A method for routing-based pin placement, the method being implemented by a non-transitory computing device including a processing unit and memory having executable instructions stored thereon, which, when executed cause the processing unit to execute the method comprising:
- receiving a logical description of a plurality of macros of a partitioned circuit, the logical description including connectivity information of each macro and a physical outline of each macro;
- generating one or more abstracted shapes as abstractions of a generic shape of actual pins for providing connections to each of the macros in accordance with the connectivity information of each of the macros, the one or more abstracted shapes conforming to dimensions of each of the macros as described by the physical outlines of each of the macros;
- freeing a routing tool to route nets for connections to the pins toward any part of one of the one or more abstracted shapes of the pins to create routed nets; and
- identifying locations where the routed nets cross the physical outlines of each of the macros as chosen locations for the actual pins.

22. The method according to claim 21, wherein the providing comprises constraining the routing tool to select one of the one or more abstracted shapes.

* * * * *